United States Patent [19]
Carment et al.

[11] Patent Number: 5,895,675
[45] Date of Patent: Apr. 20, 1999

[54] PRODUCTION OF POWDER-FORM AND TABLET-FORM SALT-AND FAT-CONTAINING FOOD PRODUCTS

[75] Inventors: Laurent Le Bourg Carment, Le Breuil-En-Auge; Anne Frot-Coutaz, Rambouillet, both of France

[73] Assignee: Nestec S. A., Vevey, Switzerland

[21] Appl. No.: 08/768,675

[22] Filed: Dec. 18, 1996

[30] Foreign Application Priority Data

Dec. 19, 1995 [EP] European Pat. Off. ............ 95203555

[51] Int. Cl.$^6$ ................................................. A23L 1/40
[52] U.S. Cl. ................. 426/99; 426/98; 426/293; 426/302; 426/589; 426/650
[58] Field of Search ..................... 426/98, 589, 650, 426/651, 302, 293, 99

[56] References Cited

U.S. PATENT DOCUMENTS

| | | |
|---|---|---|
| 3,433,650 | 3/1969 | Block et al. . |
| 3,987,207 | 10/1976 | Spaeti et al. ............................ 426/99 |
| 4,002,771 | 1/1977 | Henderson et al. .................... 426/103 |
| 4,294,862 | 10/1981 | Wilke . |
| 4,375,483 | 3/1983 | Shuford et al. . |
| 4,385,076 | 5/1983 | Crosby ................................... 426/553 |
| 4,806,370 | 2/1989 | Toyota et al. ........................... 426/99 |
| 4,844,921 | 7/1989 | Bakal et al. ............................ 426/98 |
| 5,043,018 | 8/1991 | Hamaguchi . |
| 5,451,421 | 9/1995 | Tanihara et al. . |

FOREIGN PATENT DOCUMENTS 2243653   4/1975   France .

OTHER PUBLICATIONS

Gessner G. Hawley, "The Condensed Chemical Dictionary", pp. 253–254, 1981.
Derwent Abstract No. C75–W41 418, WPI Database Accession No. 75–41418W/25, abstract of Compagnie Des Salins French Patent application No. 2243653 (1975).

*Primary Examiner*—Lien Tran
*Attorney, Agent, or Firm*—Vogt & O'Donnell, LLP

[57] ABSTRACT

A process for producing a powdery, fat-containing food product. At least one crystalline food ingredient, such as salt, and a fat are mixed to provide a paste. The paste is then milled to reduce the size of the crystals of the crystalline food ingredient and to coat the crystals with the fat. The milling is continued until a flowable powder forms. If desired, the flowable powder may then be pressed into tablets.

11 Claims, No Drawings

PRODUCTION OF POWDER-FORM AND TABLET-FORM SALT-AND FAT-CONTAINING FOOD PRODUCTS

BACKGROUND OF THE INVENTION

This invention relates to a process for producing powdered food products which contain fats; for example bouillon products, thickeners, soups and sauces. The invention also relates to the powdered food products.

Food products such as bouillon products, thickeners, soups and sauces are usually made up of blends of animal fats, vegetable fats, oils and various powdered ingredients such as salts, spices, flavour enhancers, yeast extracts, and starches. The exact composition varies from flavour to flavour, from application to application, and from manufacturer to manufacturer but the products usually contain in the region of 5 to 25% by weight fat.

Although these products are available in many forms and go through many different states during processing, they are usually not in the form of a flowable powder after the addition of the fats. Special and complicated processing is required to get them into powdered form. However, in many applications, it is convenient to have the products in the form of flowable powders; either during processing or as a final product. For example, consumers would find an instant soup product, which contained a pasty mass, to be unappealing. Similarly for instant thickeners and sauces. It would be very convenient to provide these instant products in powdered form and yet include fats.

Also, for bouillon or stock products, although these are usually sold in the form of solid cubes or tablets, it would be useful during processing to have the product in powdered form. It is conventional to prepare these solid stock products in one of two ways. In the first method, solid fats are melted and mixed. Then the melted fats are cooled on a roller to produce fat flakes made up of crystalline fat. The other ingredients of the stock product are then mixed with the fat flakes and the mixture pressed into stock tablets. The tablets are then wrapped. This is known as the "hard" process. In the second method, the solid fats are melted and then introduced into a jacketed blender where they are mixed with the other ingredients. Thereafter cooling liquid is run through the jacket of the blender to cool the mixture to crystallize the fats. The mixture is then extruded or filled into a preformed wrapping. This is known as the "soft" process.

In the hard process, it is essential for the fats to be at least partially crystallized in order for the mixture of fats and other ingredients to be sufficiently flowable. If the stock product were to be prepared from liquid fat at usual fat levels, it would be in the form of a paste which would not be sufficiently flowable. If the mixtures are not sufficiently flowable, difficulties arise during tabletting; particularly during filling of the presses. Unfortunately, the fats used in stock products are not homogenous making the reliable formation of fat crystals complicated. In particular, temperatures must be carefully controlled in order to obtain the required degree of crystallisation. Also significant amounts of energy are consumed in reducing temperatures to those at which fat crystals form. Similar procedures are required for other flowable food products such as thickeners, soups and sauces.

Also, the maintenance of fat crystals is required for adequate stability of the products. Therefore if it is necessary to store the mixture of crystalline fat and other ingredients, as is often the case, the mixture must be stored at temperatures in the region of about 20° C. or less. Again this results in energy consumption.

Therefore there is a need for a process of producing powdered, fat-containing products which is less complicated and requires less careful control of temperature.

SUMMARY OF THE INVENTION

Accordingly, this invention provides a process for producing a powdered, fat-containing product, the process comprising:

mixing at least one crystalline food ingredient and a fat to provide a paste; and milling the paste to reduce the size of the crystals of the crystalline food ingredient and to coat the crystals with the fat, the milling continuing until a flowable powder forms.

In another aspect, the invention provides a fat-containing product produced by a process as described above.

In further aspects, this invention provides a fat-containing food product in the form of a flowable powder, the product comprising particles of crystalline food ingredients of a size less than about 40 μm each coated by a layer of fat, and the invention also provides a fat-containing food product in the form of a tablet, this product again comprising particles of crystalline food ingredients having a size less than about 40 μm each coated by a layer of fat.

DETAILED DESCRIPTION OF THE INVENTION

Surprisingly, it has been found that by milling a paste made up of the fats and a suitable crystalline food ingredient, a powder is obtained once the size of the crystals becomes sufficiently small. This powder has good flowability and is formed largely independently of temperature; removing the need for careful controlling of temperature. This is a significant advantage over the prior art. Further the process has the advantage that the products produced have substantially the same organoleptic, dissolution and stability profiles as similar products produced using conventional processes but are easier to compress. It is also found that the products produced have excellent stability and long shelf lives.

The crystalline food ingredient may be salt but, if crystalline flavour enhancers are used, the food ingredients are preferably a mixture of salt and the crystalline flavour enhancers; for example salt and monosodium glutamate. Further, if the product includes other crystalline ingredients, for example sugar and spices in crystalline form which may be subjected to size reduction in a mill, these too may be included.

Preferably the fat used includes a major proportion of a fat with a high melting point. In this way, the fat is conveniently solid at room temperature. The fat content of the product may be varied as desired but is preferably from about 5% by weight to about 25% by weight; more preferably about 10% by weight to about 20% by weight; for example about 14 to 15% by weight. The mass ratio of the fat to the crystalline food ingredients is preferably in the range of 1:3 to 1:5; for example about 1:4.

Preferably the crystalline food ingredients are milled to a particle size less than about 40 μm; more preferably less than about 30 μm; for example about 15 μm to about 20 μm.

Also, teh mass ratio of the fat to the crystalline stock ingredients is preferably in the range of 1:3 to 1:5; for example about 1:4.

The crystalline food ingredients are preferably milled by causing the paste to travel between a plurality of rolls arranged one after the other; the spacing between the rolls decreasing from the first pair of rolls to the last pair of rolls.

The process may further comprise adding remaining solid food ingredients, if any, to the powder.

The process may further comprise the step of pressing the powder into tablets.

Preferably the powdered food product of the present invention has a density of less than about 750 g/l; more preferably less than about 730 g/l; for example less than 720 g/l. The tapped density of the powdered food product is preferably less than about 950 g/l; more preferably less than about 920 g/l; for example less than 900 g/l.

The powdered food product preferably has a hardness at zero compression of less than about 500N; more preferably less than about 200N; for example less than about 100N.

Embodiments of the invention are now described, by way of example only.

The fat-containing product may be produced, by mixing together of the fats and the crystalline food ingredients. The fats used in the process may be any suitable fats since the process for producing the fat-containing products may be used with any desired fats. Usually fat-containing products contain, for stability reasons, hydrogenated or fractionated vegetable fats and suitable examples are hydrogenated palm oil, hydrogenated soya oil, hydrogenated palm oleine, hydrogenated cottonseed oil, hydrogenated sunflower oil, etc. Therefore the fats preferably include hydrogenated or fractionated vegetable fats. The fats may also include animal fats or vegetable fats, or both. Examples of suitable animal fats are poultry fats such as duck and chicken fats, beef tallow, pork fat, lard and the like. Examples of suitable vegetable fats are peanut oil, olive oil, sunflower oil, safflower oil, maize oil and the like.

Usually for meat-based products, a mixture of animal and partially hydrogenated or fractionated vegetable fats is used; the animal fat being incorporated for flavour reasons. For vegetable products, a mixture of a suitable vegetable oil and partially hydrogenated or fractionated vegetable fats may be used. The fat mixture chosen is conveniently such that the fat is solid at room temperatures. The person skilled in the art will be readily able to select a fat mixture to give the desired flavour and hardness. One suitable example of a fat mixture is made up of a major portion of a hydrogenated vegetable fat and a minor portion of an animal fat; for example about 80% by weight of a hydrogenated vegetable fat and about 20% of an animal fat such as chicken fat. Another suitable example is made up of a major proportion of an animal fat; for example beef tallow, and a minor proportion of a hydrogenated vegetable fat; for example about 85% by weight of the animal fat and about 15% by weight of the vegetable fat.

The crystalline food ingredient is usually salt but, if crystalline flavour enhancers and antioxidants are used, may be a mixture of salt and the crystalline flavour enhancers and antioxidants. For example, the crystalline food ingredient may be a mixture of salt, citric acid and monosodium glutamate. Other crystalline ingredients which may be subjected to size reduction in a mill may also be included; for example sugar and spices in crystalline form.

The mixture of the fats and the crystalline food ingredients may contain ratios of fats to crystalline ingredients of about 1:3 to 1:5. Greater or smaller ratios are also acceptable if this is what is desired.

Prior to being mixed in the crystalline ingredients, the fats are preferably melted to facilitate milling of the paste. Mixing of the fats and the crystalline ingredients may take place in a suitable mixer; for example a ribbon blender, a paddle mixer, or a continuous mixer.

The paste is then milled to reduce the size of the crystals. As the size of the crystals reduces, the surface area of the crystals increases; increasing the ability of the crystals to adsorb fat. Ultimately the crystals are reduced in size sufficiently such that the paste becomes powdery and flowable. The size of the crystals at which this occurs depends upon the relative amounts of fat and crystal, the types of fat and crystal, and other such parameters. Therefore the actual size to which the crystals are reduced is not important; providing that they are reduced sufficiently. Usually, however, crystal sizes less than about 50 µm will be sufficient. For conventional amounts of fats and crystalline stock ingredients, a size of about 10 µm to 40 µm; particularly 10 µm to 20 µm gives good results.

Conveniently, the paste may be milled on a roll refiner and in which the paste is caused to travel between a plurality of rolls arranged one after the other; the spacing between the rolls decreasing from a first pair of rolls to a last pair of rolls. Roll refiners are mills which are conventionally used in the chocolate industry to mill pastes made up of sugar crystals and cocoa liquor and butter; the size of the sugar crystals being reduced to provide the usual mouthfeel of chocolate. Usually, roll refiners are constructed from three to five horizontal rolls aligned substantially one above the other. The lower two rolls are spaced apart a distance much larger than the upper two rolls. For example, the lower two rolls may be spaced about 120 to 150 µm apart while the upper two rolls are spaced about 20 µm apart. The rolls are usually rotated at different speeds; the upper rolls faster than the lower rolls. As is conventional, the rolls have internal cooling; usually recirculating cooling water. The paste is introduced between the lower two rolls at a temperature of about 30° C. and winds up the rolls in the form of a film of decreasing thickness. As the film moves up, the size of the crystals is reduced and the fat coats the crystals. The film is removed from the top roll. At this stage, the mixture is in the form of a soft, flowable powder.

The powder is then collected using any suitable transport mechanism and, if necessary, stored. Unlike the prior art mixtures of fat crystals and dry ingredients which must be stored at temperatures below 20° C., the powder may be stored at temperatures up to 30° C. Consequently, cold storage is not necessary.

Any additional dry ingredients of the product may then be added. These remaining solid ingredients may vary tremendously depending upon the desired flavour of the product, available raw materials, the desired texture of the product and the like. For example, ingredients such as sugars, starches, yeast extracts, meat or vegetable powders, spices, flavouring agents, colouring agents, and dried herbs, may be used in varying amounts. Usually, these additional dry ingredients comprise about 10% to about 35% by weight of the stock product; for example about 30% by weight.

At this stage, the mixture comprises a flowable powder of a mixture of fat coated crystals and particles of the dry ingredients. The flowability of the powder is about the same as that of well made conventional mixtures. This is surprisingly good given the lack of tight temperature control. However the density of the powder is about 10% less than that of conventional mixtures and the compressibility is much higher.

The mixture may again be stored if required. Again the powder may be stored at temperatures up to 30° C. If it is desired to press the powder into tablets, the powder is transferred to a suitable press for pressing into tablets. This may be carried out on conventional presses as is conventional. The solid product may then be wrapped and packaged as is conventional.

The powdery mixture has the significant advantage that it is readily compressible to a desired degree of hardness. This implies that much less energy need be expended in obtaining a tablet of the required degree of hardness. Also, the product has a lower density than would be the case for conventional products of the same composition. Therefore the fillers such as maltodextrin conventionally used in stock products may be omitted or reduced. These fillers are usually only used to provide the stock products with a volume that consumers are accustomed to. It is also found that the tablets produced have a better visual appearance; more homogeneous, no large fatty deposits, and more regular edges. They also have a completely different texture in that they are made up of small, milled particles coated by fat.

If desired, suitable antioxidants may be incorporated in the fat prior to it being melted and mixed with the crystalline stock ingredients. For example, a natural antioxidant, such as a Tocopherol or ascorbic acid, may be incorporated into the fat. Also, as discussed previously, crystalline citric acid may be incorporated into the product; preferably prior to milling. The citric acid operates as a chelating agent which inactivates iron in the product; the iron otherwise being able to operate as a catalyst for oxidation reactions. If permitted under food regulations, organic antioxidants such as butylated hydroxytoluene (BHT) and butylated hydroxyanisole (BHA) may also be used. These antioxidants are suitably present in minor amounts; for example less than about 1.5% by weight and within levels permitted by food regulations.

Since iron is a catalyst for lipid oxidation, to further reduce fat oxidation it is preferred if the rolls used in the mill are not made of iron containing metals, or contain a suitable non-ferrous coating, or are made of stainless steels which are not likely to contaminate the fats with iron. Also, iron chelating agents such as citric acid may be included in the products.

The products may be used as instant bouillon products, instant sauces, instant thickeners, instant soups and the like since the products dissolve rapidly in hot water.

Example 1

Embodiments of the invention are now described, by way of example only.

A fat mixture comprising about 80% by weight of hydrogenated palm oil fat and about 20% by weight peanut oil is prepared. The fat mixture is then melted. Salt and monosodium glutamate are then mixed with the fat mixture in a ribbon blender. The mixture comprises about 55% by weight salt, about 25% by weight monosodium glutamate and about 20% by weight of the fat.

The mixture is transferred to a Buhler roll refiner which has three rolls of 0.6 m length. The mixture is then milled to reduce the size of the salt and glutamate particles to less than about 20 μm using the roll refiner according to manufacturer's instructions. A powdery mixture is collected from the top roll of the roll refiner.

About 72% by weight of the powdery mixture is combined with about 27% by weight of a mixture of dried ingredients comprising dried chicken meat grounds, spices, flavourants, and herbs. The density and the tapped density of the mixture is determined to be 690 g/l and 860 g/l respectively. The flowability of the powder is measured by determining the angle which is required for the powder to flow. The angle is about 55.5°.

About 9.5 g of the mixture is placed in an Adamel press and pressed into a tablet. The force required to achieve selected tablet thicknesses is determined. The hardness of the tablet for each thickness is determined. The results are as follows:

| Compression/ N | Thickness/ mm | Hardness/ N |
| --- | --- | --- |
| 1000 | 10.04 | 50.75 |
| 3000 | 9.21 | 89.5 |
| 5000 | 8.85 | 116.5 |
| 7000 | 8.73 | 126 |
| 10000 | 8.66 | 133 |
| 14000 | 8.65 | 132 |

Extrapolation of the results gives a tablet hardness at zero compression of 18.3N. This indicates that the powdery mixture is readily compressible to a selected hardness. The tablet dissolves in hot water in 1 minute and 10 seconds; which is very good.

For comparison, a stock product is prepared using the prior art process of mixing crystalline fat flakes and solid ingredients. The same ingredients as used above are used in the same amounts. Prior to tabletting, the mixture has a density of 777 g/l and a tapped density of 991 g/l. The flow angle required for flow is 56.50°. It is impossible to compress the mixture in the Adamel press at a force less than 4000N. Extrapolation of the results gives a tablet hardness at zero compression of 3.9N indicating that the mixture is not as readily compressible to a selected hardness. The tablet dissolves in hot water in 1 minute and 30 seconds.

The results indicate that the powdery mixture of example 1 is much easier to compress to a desired hardness than the comparison and dissolves quicker than the comparison. Also an excellent tablet is obtained.

Example 2

Example 1 is repeated except that a five roll Carle Montanari roll refiner is used to mill the salt, glutamate and fat mixture.

The powdery mixture prior to pressing has a density of 719 g/l, a tapped density of 882 g/l, and a flow angle required for flow of 54.5°.

About 9.5 g of the mixture is placed in an Adamel press and pressed into a tablet. The force required to achieve selected tablet thicknesses is determined. The hardness of the tablet for each thickness is determined. The results are as follows:

| Compression/ N | Thickness/ mm | Hardness/ N |
| --- | --- | --- |
| 1000 | 9.73 | 52.85 |
| 3000 | 9.03 | 105.5 |
| 5000 | 8.81 | 128 |
| 7000 | 8.69 | 133.5 |
| 10000 | 8.58 | 142.5 |
| 14000 | 8.46 | 141.5 |

Extrapolation of the results gives a tablet hardness at zero compression of 55.5N. Again this indicates that the powdery mixture is readily compressible to a selected hardness. The tablet dissolves in hot water in 1 minute and 20 seconds. Again the tablet obtained is excellent.

Example 3

Example 1 is repeated except that the fat, salt and glutamate mixture is stored at 30° C. for 16 days prior to roll refining and for 16 days at 30° C. prior to pressing. The results are much the same as those of Example 1 indicating that storage at 30° C. has little effect.

Example 4

The procedure of Example 2 is repeated except that the fat mixture is made up of about 60% by weight of hydrogenated palm oil fat and about 40% by weight peanut oil.

The powdery mixture prior to pressing has a density of 710 g/l, a tapped density of 916 g/l, and a flow angle required for flow of 61.50.

About 9.5 g of the mixture is placed in an Adamel press and pressed into a tablet. The force required to achieve selected tablet thicknesses is determined. The hardness of the tablet for each thickness is determined. The results are as follows:

| Compression/ N | Thickness/ mm | Hardness/ N |
| --- | --- | --- |
| 1000 | 10.59 | 21 |
| 3000 | 9.98 | 36.9 |
| 5000 | 9.54 | 43.3 |
| 7000 | 9.35 | 52 |
| 10000 | 9.21 | 70 |
| 14000 | 9.06 | 71.2 |

Extrapolation of the results gives a tablet hardness at zero compression of 9.3N. The tablet obtained is acceptable.

Example 5

Example 2 is repeated except that chicken oil is substituted for the peanut oil. The results obtained are substantially the same as that for Example 2. An excellent tablet is obtained.

We claim:

1. A process for preparing a fat-containing food product comprising mixing salt crystals and a fat to obtain a paste and roll-refining the paste to mill the paste, wherein the paste is fed to, between and from a first pair of spaced-apart rolls of a plurality of rolls and milled material is fed to, between and from a last pair of spaced-apart rolls and wherein the first roll pair rolls are spaced apart a distance larger than a distance the last roll pair rolls are spaced apart, (a) to size-reduce the salt crystals to provide size-reduced salt particles having a size of less than about 40 μm and (b) to coat the size-reduced salt particles with the fat and (c) to obtain a flowable powder product from the last roll pair.

2. A process according to claim 1 wherein the salt crystals and fat are mixed in a mass ratio of fat to salt crystals of from 1:3 to 1:5.

3. A process according to claim 1 wherein the salt crystals and fat are mixed and milled so that the powder product comprises the fat in an amount of from 5% to 25% by weight.

4. A process according to claim 1 therein the fat mixed with the salt crystals is a melted fat.

5. A process according to claim 1 further comprising pressing the powder product into a tablet form.

6. A process according to claim 1 further comprising mixing the powder product with at least one ingredient selected from the group consisting of a starch, a yeast extract, a meat powder, a vegetable powder, a spice, an herb, a flavoring agent and a coloring agent to obtain a mixture product comprising the powder product and the at least one ingredient.

7. A process according to claim 6 further comprising pressing the mixture comprising the powder product into a tablet form.

8. A process according to claim 6 further comprising mixing an iron chelating agent with the salt crystals and fat.

9. A process according to claim 8 wherein the iron chelating agent is crystalline citric acid.

10. A process according to claim 1 further comprising mixing monosodium glutamate with the salt crystals and fat.

11. A process according to claim 1 wherein the fat mixed with the salt crystals comprises a fat selected from the group consisting of hydrogenated vegetable fat and fractionated vegetable fat.

* * * * *

UNITED STATES PATENT AND TRADEMARK OFFICE
CERTIFICATE OF CORRECTION

PATENT NO. : 5,895,675
DATED : April 20, 1999
INVENTOR(S) : Carment et al.

It is certified that error appears in the above-identified patent and that said Letters Patent is hereby corrected as shown below:

Title Page: Item [75] "Inventors", inventor Carment's name should have been printed as --Laurent Carment --

Column 2, line 61, "teh" should have been printed as -- the --

Column 3, line 16, delete the comma.

Column 5, line 41, instead of "Example 1", should be -- EXAMPLES --

Column 5, between lines 44 and 45, should be the heading "Example 1".

column 8, line 30, delte "6" and insert -- 1 --.

Signed and Sealed this

Fourteenth Day of September, 1999

Attest:

Q. TODD DICKINSON

*Attesting Officer*  *Acting Commissioner of Patents and Trademarks*